United States Patent [19]

Carlin

[11] 4,149,943

[45] Apr. 17, 1979

[54] METHOD OF RECOVERING MERCURY

[75] Inventor: William W. Carlin, Portland, Tex.

[73] Assignee: PPG Industries, Inc., Pittsburgh, Pa.

[21] Appl. No.: 904,140

[22] Filed: May 5, 1978

Related U.S. Application Data

[63] Continuation of Ser. No. 829,409, Aug. 31, 1977, abandoned.

[51] Int. Cl.$^2$ .............................................. C25C 1/16
[52] U.S. Cl. .................................. 204/105 R; 204/99
[58] Field of Search ............................. 204/99, 105 R

[56] References Cited

U.S. PATENT DOCUMENTS

| | | | |
|---|---|---|---|
| 2,860,952 | 11/1958 | Bergerow et al. | 423/102 |
| 3,115,389 | 12/1963 | Deriaz | 423/158 |
| 3,647,359 | 3/1972 | Bell | 204/99 |
| 3,691,037 | 9/1972 | Updyke | 204/99 |
| 3,801,480 | 4/1974 | Krieg | 204/99 |
| 4,012,297 | 3/1977 | Balko et al. | 204/99 |

*Primary Examiner*—R. L. Andrews
*Attorney, Agent, or Firm*—Richard M. Goldman

[57] ABSTRACT

Disclosed is a method of operating an electrolytic cell of the flowing mercury amalgam cathode type. According to the disclosed process, fortified alkali metal chloride brine is fed to the cell while an electrical current is passed through the cell. Depleted brine, diminished in alkali metal chloride content and enhanced in mercury content, is recovered from the cell. The depleted brine is dechlorinated and then refortified with alkali metal chloride. Thereafter, the refortified brine is treated to precipitate sulfate and alkaline earth metal contaminates as well as mercury. The purified, refortified brine is then introduced to a flowing mercury amalgam cathode electrolytic cell. The mercury recovery process is characterized by adding an alkaline hypochlorite solution to the precipitated impurities in order to form a soluble mercury salt, separating the soluble mercury salt from the precipitate at an alkaline pH, and then acidifying the solution of the soluble mercury salt. Thereafter, the mercury salt solution is electrolyzed between an anode and a cathode in order to evolve metallic mercury at the cathode.

9 Claims, 1 Drawing Figure

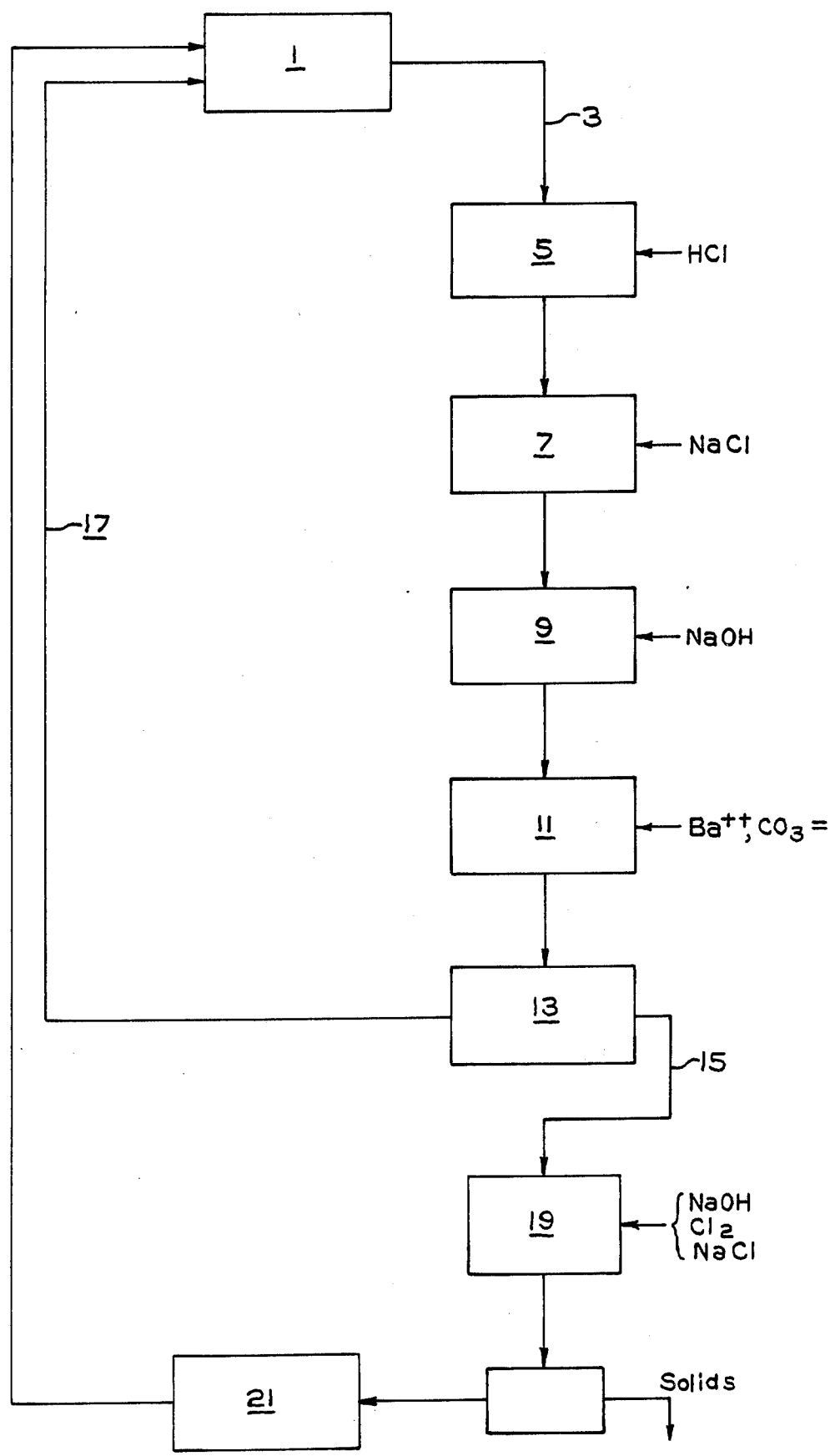

METHOD OF RECOVERING MERCURY

This is a continuation of application Ser. No. 829,409, filed Aug. 31, 1977, now abandoned.

DESCRIPTION OF THE INVENTION

Caustic soda and chlorine may be produced by the electrolytic decomposition of sodium chloride salt in the two-step mercury cell process. The mercury cell is characterized by having a flowing mercury amalgam cathode with an anode suspended from about $\frac{1}{8}$ to about $\frac{1}{4}$ inch above the mercury cathode and a film of aqueous alkali metal chloride brine flowing therebetween. Chlorine gas is evolved at the anode according to the reaction:

$$Cl^- \rightarrow \tfrac{1}{2}Cl_2 + e^-,$$

and the alkali metal, typically sodium or potassium, is deposited at the surface of the flowing mercury cathode in which it dissolves to form a mercury-alkali metal amalgam according to the reaction:

$$Na^+ + (Hg) + e^- \rightarrow Na(Hg).$$

The mercury-alkali metal amalgam is withdrawn from the electrolytic cell and fed to a denuder, also known as a decomposer. The amalgam is decomposed by the action of water in the internally shorted decomposer, yielding alkali metal hydroxide and hydrogen gas. The reaction at the anode of the denuder is:

$$Na(Hg) \rightarrow Na^+ + (Hg) + e^-,$$

and at the cathode thereof is:

$$H_2O + e^- \rightarrow OH^- + \tfrac{1}{2}H_2.$$

The depleted brine is recovered from the flowing mercury amalgam cathode electrolytic cell and is dechlorinated. Dechlorination of depleted brine is by acidification with hydrochloric acid. The acid reacts with the hypochlorous acid present in the chlorinated, depleted brine to evolve chlorine. Thereafter, the depleted brine may be treated in various ways to remove any remaining chlorine, for example, by blowing compressed air through depleted brine in a column or treating the brine with sulfuric acid.

The depleted brine, dechlorinated, having an alkaline pH above about 7 and typically containing from about 200 to about 280 grams per liter of sodium chloride, is then fortified, for example, to saturation, by passage through a bed of salt in dissolving tanks. The fortification introduces various impurities into the refortified brine, for example, calcium ions and sulfate ions among others. The resaturated brine, i.e., fortified brine, is then purified to remove these impurities. Brine purification is typically carried out by adding barium carbonate to remove sulfate ion, sodium carbonate and sodium bicarbonate to remove calcium ion, and sodium hydroxide to remove the excess of sulfide ion.

In the mercury cell process, only about 10 to about 25 percent of the salt contained in a brine feed is electrolyzed and it is necessary to circulate large amounts of brine and resaturate the brine as described above. The chlorinated brine chlorinates some of the mercury to form mercuric chloride. The chlorinated, depleted brine leaving the cell contains mercury, both elemental and combined, but usually in the form of mercuric chloride. The amount of mercury leaving the cell in the depleted brine is usually from about 1.5 to about 15 milligrams per liter of the depleted brine although it may be greater when cell upsets occur during operation, for example, as much as 200 milligrams per liter or even more of mercury in the depleted brine. The amount of mercury potentially lost in this way not only represents a considerable amount of mercury but also gives rise to potential ecological problems. Depending on the method used for separating the precipitates and floc materials from the saturated brine, a large amount of mercury may remain in the brine filter sludge and thus actually be lost.

For this reason, sulfide ion, typically in the form of either sodium sulfide or hydrogen sulfide, is added to the resaturated or fortified brine in order to precipitate the mercury. Normally, the sulfide is added as sodium sulfide and normally the brine is at a pH of 8 to 10. The brine is then clarified in a settler or other physical separation tank and returned to the mercury cell. Nevertheless, some of the mercury is lost with the filter cake or the filtrate.

According to the method of this invention, the mercury values in the brine are recovered from the filter cake or precipitate by solubilization with hypochlorite, adjustment of pH, and electrolytic recovery.

DETAILED DESCRIPTION OF THE INVENTION

The method of this invention may be understood by reference to the FIGURE appended thereto. The FIGURE shows a flow chart of the process with a flowing mercury amalgam cathode electrolytic cell, 1, from which a brine line, 3, containing depleted brine goes from the cell, 1, to a dechlorinator, 5, where hydrochloric acid is added to the depleted brine in order to remove the chlorine therefrom. The dechlorinated, depleted brine then passes to a dissolver or resaturator, 7, where solid salt addition resaturates the brine up to a level of 315 to about 325 grams per liter of sodium chloride, depending on the temperature thereof. The resaturation with solid salt typically results in the introduction of impurities such as calcium ion and sulfite ion to the brine. This resaturated brine then passes from the dissolver or resaturator, 7, to a neutralizer, 9, where sodium hydroxide is added. The neutralized brine, having a pH of from about 7 to about 10, next goes to a precipitator where barium ions typically in the form of barium carbonate, carbonate ion typically in the form of sodium carbonate, and sulfide ion typically in the form of sodium sulfide, are added to precipitate the calcium ion, sulfate ion, and mercury. The resulting slurry is then passed from the precipitator, 11, to filter, 13, where it is separated into a solid portion, 15, and a liquid portion, 17. The liquid portion, 17, is a resaturated, dechlorinated brine reduced in calcium content, sulfate content, and mercury content. The brine so treated is typically recirculated to the flowing mercury amalgam cathode electrolytic cell, 1.

The solid material is further treated in a reactor, 19, by the addition of an oxidant that is compatible with the flowing mercury amalgam electrolytic cell process. A preferred oxidant is sodium hypochlorite, NaOCl. According to one exemplification, the sodium hypochlorite is formed by the reaction of sodium hydroxide, chlorine, and sodium chloride to produce sodium hypochlorite. The sodium hypochlorite reacts with the mercury sulfide to form a red to reddish-brown slurry that separates from the filter cake.

The substantially mercury-free filter cake is disposed of. The red to reddish-brown slurry has a pH of from about 9 to about 14 and most frequently from 9.3 to 9.8. The slurry is treated with an amount of hydrochloric acid sufficient to reduce the pH thereof below about 8.5 and preferably about 7, whereby to decolorize the red to reddish-brown slurry and solubilize the floc as well as to react any excess of hypochlorite ion in the solution. The solution, containing mercury ion and having a pH below about 8.5 and preferably about 7, is then fed to an electrolytic cell, 21, where an electrolytic current is passed through the cell, causing the mercury to be recovered as metallic mercury at the cathode thereof.

According to the method of this invention of operating a flowing mercury amalgam cathode electrolytic cell, a fortified sodium chloride brine containing from about 300 to about 325 grams per liter of sodium chloride is fed to the flowing mercury amalgam cathode electrolytic cell while an electrical current is passed through the cell from an insoluble anode to the flowing mercury amalgam cathode. Chlorine gas and a mercury-sodium amalgam cathode are recovered as products from the cell.

Depleted brine is recovered from the flowing mercury amalgam cathode electrolytic cell. The brine is diminished in alkali metal chloride content by from about 15 to about 25 percent, that is, to a sodium chloride content of from about 200 to about 250 grams per liter. The mercury content of the depleted brine is typically from about 1.5 to about 15 milligrams per liter although it may be as high as 25 or even 50 milligrams per liter depending upon operating conditions, and may, in the event of cell upset, be as high as 200 or more milligrams per liter.

The depleted brine is dechlorinated, refortified in alkali metal chloride content, and purified. Purification typically involves the addition of barium compounds, e.g., about 1 to about 4 grams per liter of barium carbonate, to precipitate sulfate ion therefrom, carbonate compounds, typically about 6 to about 14 grams per liter of sodium carbonate and sodium bicarbonate, to precipitate calcium compounds such as calcium carbonate therefrom, and sulfide compounds, such as sodium sulfide, e.g., about 0.01 to about 0.2 grams per liter of sodium sulfide, to precipitate the mercury. The precipitates, generally barium sulfate, calcium carbonate, and mercury sulfide, are withdrawn from the fortified brine, for example, by filtration. The fortified, purified brine is then recirculated to a flowing mercury amalgam cathode electrolytic cell. In a multi-cell plant, this may be a different cell than the one from which the brine was originally received.

According to the method of this invention, a compatible oxidizing agent such as an alkaline hypochlorite solution is added to the precipitate in order to form a red to reddish-brown slurry. Thereafter, the red to reddish-brown slurry is separated from the precipitate at an alkaline pH, acidified to decolorize and dissolve the floc, e.g., to a pH below about 8.3 and preferably about 7.0 by the addition of hydrochloric acid, and thereafter electrolyzed between an anode and a solid cathode whereby to evolve metallic mercury at the solid cathode.

Generally, the compatible oxidizing agent is an alkali metal hypochlorite such as potassium hypochlorite when potassium chloride is being electrolyzed and sodium hypochlorite when sodium chloride is being electrolyzed. According to a preferred exemplification, the hypochlorite is formed is situ by the reaction of the chloride, the hydroxide, and chlorine.

When the oxidizing agent is sodium hypochlorite, the sodium hypochlorite is typically added to the mercury sulfide containing filter cake in an amount of from about 1.25 moles of hypochlorite ion per mole of mercury to about 4.6 moles of hypochlorite ion per mole of mercury. The addition is generally as an aqueous liquid composition. When the hypochlorite ion is added as sodium hypochlorite, the sodium hypochlorite content is generally from about 3 to about 8 weight percent. The temperature of the hypochlorite solution is not critical.

The hypochlorite reacts with the mercuric sulfide thereby exothermically forming a slurry containing a red to reddish-brown solid. Thereafter, sufficient hydrochloric acid is added to the slurry to convert the red floc to a white floc and thereafter solubilize the floc. The amount of hydrochloric acid required to decolorize the floc and thereafter solubilize the floc is an amount sufficient to reduce the pH of the composition below about pH=8.3. This is generally at least about 0.2 grams of hydrochloric acid, anhydrous basis, per gram of mercury, and preferably from about 0.2 to about 0.5 grams of hydrochloric acid, anhydrous basis, per gram of mercury.

The soluble mercury salt, at a pH below 8.3, may then be electrolyzed between an anode and a cathode. Typically, the pH is from about 6 to about 8, with a pH being preferred for high recoveries and high current efficiency. At pH's much above 8 or much below 6, the current efficiency and percent removal are reduced. The anode and cathode should be substantially immune to attack by the mercury-containing acidified electrolyte.

Typical anode materials include coated anodes having a valve metal substrate with a suitable electrocatalytic surface thereon, for example, platinized titanium substrate or ruthenium dioxide-titanium dioxide coated titanium substrate. Suitable cathode materials include silver, copper, iron, steel, and the like.

The cathode current density may be from several amperes per square foot up to several thousand amperes per square foot, for example, from about 10 amperes per square foot to about 15 or even 1,000 or even 2,000 amperes per square foot.

Thereafter, the mercury recovered at the cathode may be removed from the electrolytic cell and either returned to the process or otherwise collected and controlled.

The following examples are illustrative.

EXAMPLES

A. Preparation of Mercury Sulfide

Simulated mercury cell plant mercury sulfide was prepared by adding 112 grams, a stoichiometric excess, of reagent grade 70 weight percent ammonium sulfide to 1,150 grams of a 129 grams per liter solution of mercuric nitrate, $Hg(NO_3)_2$, in deionized water. The resulting black mercury sulfide precipitate was elutriated with deionized water until the excess soluble sulfide, ammonium sulfide, was removed from the precipitate.

The washed mercury sulfide, HgS, precipitate was allowed to stand in deionized water for five days. Thereafter, the precipitate was filtered and a mercury sulfide, HgS, filtrate was obtained.

In order to determine the effect of drying, the filtrate was divided into two portions. One portion was allowed to remain as a wet filter cake containing approximately 54 weight percent water. The second portion was heated to 110° C. for 24 hours in order to obtain a dry mercury sulfide product.

B. Treatment with Sodium Hypochlorite

The black mercury sulfide precipitates, both dried and wet, were separated into seven portions to which 5.25 weight percent NaOCl was added as shown in Table I. Upon the addition of the NaOCl, the solid black precipitates to a soluble form containing small amounts of white solids.

C. Electrolytic Cell

A glass 250 milliliter beaker was utilized as the electrolytic cell. The beaker has a 2.5 centimeter by 0.5 centimeter platinized titanium anode. Two cathodes were utilized, a 10 centimeter length of 1.3 millimeter diameter silver wire having a 7 centimeter portion immersed in the electrolyte, for a cathode area of 2.86 square centimeters, and a 10 centimeter length of 1.9 millimeter diameter copper wire having a 7 centimeter portion immersed in the electrolyte for a cathode area of 4.18 square centimeter. The cathode type and cathode area are shown in Table I.

The power supply was a Lambda LP-531-FM constant current source with the current measured by a Fluke 8000A Digital Multimeter. The current and current density are shown in Table I.

D. Electrolysis

After formation of the solution of soluble mercury, the pH of the solution was adjusted to pH=7 by the addition of 33 weight percent HCl as shown in Table I. The solution was then electrolyzed in the beaker cell for the time and at the current densities shown in Table I, and mercury droplets were observed to form on the wire cathode and to be present on the bottom of the beaker.

Two of the dried samples were soaked in an equal weight of water for 24 hours prior to treatment with the NaOCl.

E. Mercury Recovery

Mercury recovery was determined by weighing the mercury droplets in the bottom of the beaker cell and the increase in weight of the wire cathode. The weight of mercury recovered and cathode current efficiency are shown in Table I.

While the invention is described with respect to certain exemplifications and embodiments thereof, the invention is not to be so limited except as described in the claims appended hereto.

I claim:

1. In a method of operating a flowing mercury amalgam cathode electrolytic cell comprising feeding a fortified alkali metal chloride brine to said cell while passing an electrical current through said cell, recovering said brine from said cell diminished in alkali metal chloride content and enhanced in mercury content, dechlorinating said brine, refortifying said brine in alkali metal chloride content, adding barium compounds, carbonate compounds, and sulfide compounds to said fortified brine as precipitants, withdrawing precipitates from said fortified brine and introducing said fortified brine to a flowing mercury amalgam cathode electrolytic cell, the improvement comprising:
   (a) adding an alkaline hypochlorite solution to said precipitate whereby to form a red slurry;
   (b) acidifying the red slurry to decolorize and dissolve the solids; and
   (c) electrolyzing the resulting liquid between an anode and a cathode at a pH of from 6 to 8.3 whereby to evolve metallic mercury at said cathode.

2. The method of claim 1 comprising acidifying said red slurry to a pH of from 6.0 to 8.3.

3. The method of claim 2 comprising adding at least about 0.2 gram of hydrochloric acid, anhydrous basis, per gram of mercury to said red slurry.

4. In a method of purifying and fortifying brine containing mercury values and chlorine comprising dechlorinating said brine, fortifying said brine in alkali metal chloride content, adding barium compounds, carbonate compounds, and sulfide compounds to said fortified brine as precipitants, and withdrawing precipitates from said fortified brine, the improvement comprising:
   (a) adding an alkaline hypochlorite solution to said precipitate whereby to form a red slurry;
   (b) acidifying the red slurry to decolorize and dissolve the solids; and
   (c) electrolyzing the resulting liquid between an anode and a cathode at a pH of from 6 to 8.3 whereby to evolve metallic mercury at said cathode.

5. The method of claim 4 comprising acidifying said red slurry to a pH of from 6.0 to 8.3.

6. The method of claim 5 comprising adding at least about 0.2 gram of hydrochloric acid, anhydrous basis, per gram of mercury to said red slurry.

TABLE I

| Run # | History of HgS | Weight of HgS | Weight of NaOCl | NaOCl/HgS | Type of Cathode | Cathode Area cm$^2$ | Current Amperes | Current Density (ampere per cm$^2$) | Mercury (gms) | Recovery (%) | Cathode Current Efficiency (%) |
|---|---|---|---|---|---|---|---|---|---|---|---|
| I | Precipitated | 7.46 (6.43) | 4.18 | 0.50 | silver wire | 2.86 | 0.192 | 0.067 | 6.17 | 96 | 26 |
| II | Dried | 2.99 (2.58) | 4.43 | 1.45 | copper wire | 4.18 | 4.47 | 1.069 | 1.29 | 50 | 52 |
| III | Dried | 2.99 (2.58) | 4.22 | 1.41 | copper wire | 4.18 | 7.53 | 1.802 | 1.81 | 70 | 33 |
| IV | Dried | 2.99 (2.58) | 4.22 | 1.41 | copper wire | 4.18 | 7.53 | 1.802 | 2.58 | 100 | 50 |
| V | Dried, Soaked | 3.83 (2.58) | | 1.28 | copper wire | 4.18 | 5.02 | 1.201 | 2.53 | 98 | 45 |
| VI | Dried, Soaked | 2.99 (2.58) | 3.68 | 1.23 | copper wire | 4.18 | 4.52 | 1.081 | 2.01 | 78 | 67 |

7. In a method of purifying and refortifying depleted brine from a flowing mercury amalgam cathode electrolytic cell comprising recovering depleted brine from said cell, refortifying said brine in alkali metal chloride content, adding barium compounds, carbonate compounds, and sulfide compounds to said fortified brine as precipitants, and withdrawing precipitates from said fortified brine, the improvement comprising:
   (a) adding an alkaline hypochlorite solution to said precipitate whereby to form a red slurry;
   (b) acidifying the red slurry to decolorize and dissolve the solids; and
   (c) electrolyzing the resulting liquid between an anode and a cathode at a pH of from 6 to 8.3 whereby to evolve metallic mercury at said cathode.

8. The method of claim 7 comprising acidifying said red slurry to a pH of from 6.0 to 8.3.

9. The method of claim 8 comprising adding at least about 0.2 gram of hydrochloric acid, anhydrous basis, per gram of mercury to said red slurry.

* * * * *